March 18, 1969  J. C. E. FLINT  3,433,453
FLUID SEALS
Filed Nov. 19, 1965
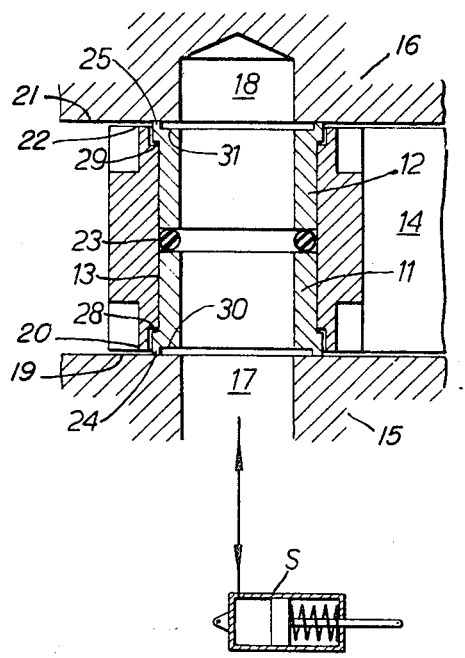
INVENTOR
JOHN C.E. FLINT
BY
Orland M. Christensen
ATTORNEY

United States Patent Office 3,433,453
Patented Mar. 18, 1969

3,433,453
FLUID SEALS
John C. E. Flint, Chalford, England, assignor, by mesne assignments, to Dowty Hydraulic Units Limited, Cheltenham, England
Filed Nov. 19, 1965, Ser. No. 508,648
Claims priority, application Great Britain, Nov. 21, 1964, 47,475/64; Apr. 23, 1965, 17,162/65
The portion of the term of the patent subsequent to Feb. 27, 1985, has been disclaimed
U.S. Cl. 251—282          3 Claims
Int. Cl. F16k *39/00;* F16j *15/14*

ABSTRACT OF THE DISCLOSURE

A fluid seal assembly, suitable for positioning in a slider movable between adjacent casing components, is positioned in an aperture in the slider and comprises two hollow members urged into sealing engagement with the casing components by a resilient member common to both, each hollow member being stepped upon its external surface to provide such relative pressure distribution on the end faces of the members as to reduce friction between the members and the faces of the adjacent components with which they engage.

---

According to this invention, a fluid seal suitable for positioning between at least two components having flat mating surfaces, in a manner whereby fluid can pass under pressure through aligned apertures in the components substantially without leakage past said mating surfaces, comprises at least one hollow member housed with a sliding fit in an aperture in one of the said components, said member, or at least one of said members, being urged outwardly of its aperture by resilient means into sealing engagement with that part of the flat mating surface surrounding the aperture in the other component.

The said one component may house a pair of hollow members, be of rectangular cross-section and be disposed within said other component and another component, also having a flat mating surface. In this case both hollow members are urged outwardly of the aperture into sealing engagement with their adjacent and respective flat mating surfaces. Also the resilient means is interposed between the two hollow members.

The apertures may be of circular cross-section and the hollow members of cylindrical form. The said resilient means may be a sealing ring of circular or like cross-section, either separate from the member or members, or bonded to them.

The said resilient means may alternatively comprise a sealing ring and a mechanical spring in combination.

The portion of the end of each hollow member which is in engagement with a flat mating surface may be reduced in annular area with respect ot the main portion of the member. In this way when it is required that one of the said components is displaced in linear sliding manner with respect to the other component, only low friction is evident between the end of each hollow member and a respective flat mating surface with which the hollow member is in engagement.

The end of each hollow member may have its external surface stepped to provide such relative pressure distribution on the end faces of the member or members as to reduce friction at the sealing surfaces.

By these arrangements fluid sealing is afforded between the outer end portion of the end of each hollow member and the flat mating surface, or surfaces, and where the resilient means takes the form of, or includes a sealing ring, this also affords fluid sealing between the inner end portions of the hollow members.

The invention will now be particularly described by way of example with reference to the accompanying diagrammatic drawings, of which, FIGURE 1 is a cross-section of a fluid seal assembly suitable for a slide valve.

Referring to FIGURE 1 of the drawings, a fluid seal assembly suitable for a slide valve comprises a pair of hollow cylindrical members 11 and 12 intended to be mounted in sliding manner in an aperture 13 of circular cross-section provided in the displaceable member or slider 14 of the slide valve. This slider 14 is displaceable linearly and is of rectangular cross-section in a plane at right-angles to its direction of motion. The slider 14 is enclosed by two casing plates 15 and 16 and a circular aperture is provided in the casing plate 15 while a blind bore 18, also of circular cross-section, is provided in the casing plate 16. The casing plate 15 has a flat surface 19 which mates with a flat surface 20 formed on one side of the slider 14, while the casing plate 16 has a flat surface 21 which mates with a flat surface 22 on the other side of the slider.

In this construction it is a requirement that when the slider is in a position such that the aperture 17, the blind bore 18 and the aperture 13 are in co-axial alignment, there should be no liquid leakage from the interior of the members 11 and 12, the aperture 17 or the bore 18 past the small clearances between the flat mating surfaces 19, 20, and 21, 22.

Resilient means in the form of a rubber ring 23 of circular cross-section is interposed between the hollow members 11 and 12. The inherent resilient characteristics of this rubber ring are such that the hollow members 11 and 12 are urged into engagement with the flat surfaces 19 and 21 respectively.

Those faces of the hollow cylindrical members 11 and 12 which are in engagement with the flat surfaces 19, 21, are stepped to provide portions 24 and 25 which are of such radial thickness with respect to the main portion of the members 11 and 12 as to present annular engaging surfaces, of relatively small area, to the flat surfaces 19 and 21.

The hollow members 11 and 12 which therefore provide shear seals for the slider 14, in the region of the aperture 17 and blind bore 18, are of metal.

By virtue of the portions 24 and 25 on the members 11 and 12, a differential area effect is obtained, one end of each member with respect to the other.

Thus when the slider 14 is in the position shown in the drawing, so that the apertures 13, 17 and blind bore 18 are in coaxial alignment, the pressure pertaining therein is applied through the medium of the rubber ring 23 to overbalance the liquid pressure at least on the portion of the outward face of the respective cylindrical member not in engagement with the adjacent face of the casing. Consequently, an overbalance of the forces is provided in the sealing direction so that a good seal is provided between the portions 24 and 25 and the adjacent faces 19, 21 of the casing plates, but at the same time the sealing force is not so high as to cause undesirably high friction when it is required to move the slider.

The rubber ring 23 serves another purpose in that it seals against the wall of the aperture 13. In the drawing, the rubber ring is shown in its deformed state under pressure.

The dimensions of the cylindrical members 11 and 12 and of the casing plates 15, 16 are such that upon assembly, the sealing ring 23 is arranged to fit between the members 11 and 12 with a slight pinch upon it, thus maintaining initial contact between the portions 24 and 25 and the appropriate faces 19 and 21.

Thus, with the slider in the position as shown in the drawing, substantially no leakage can occur from the interior of the aperture 17, blind bore 18 and members 11 and 12, past the portions 24 and 25 into the clearance between the faces 19, 20 and 21, 22. This ensures that a service S connected by way of a suitable passageway to the aperture 17 is held in an hydraulically locked condition when the slider 14 is in this position with the apertures 13 and 17 and the bore 18 in co-axial alignment. As soon as the slider 14 is displaced from this aligned position, the state of hydraulic lock is lost and the slider is moved to such a position that the aperture 17 is either placed in communication with liquid under pressure or, alternatively, is in communication with drain.

By virtue of the small annular areas of the portions 24 and 25, high friction forces ordinarily characteristic of shear seals are reduced considerably during the sliding of the slider.

It will be seen that the ends of members 11 are stepped respectively at 28 and 29 to a slightly increased diameter so that the portions 24 and 25 are of larger mean diameter than the adjacent portions shown in FIGURE 1. The aperture 13 is also stepped in diameter to accommodate the slightly increased diameter of these outer end portions of the cylindrical members 11 and 12.

By so increasing the mean diameter of the portion 24 and 25, a larger annular face area 30, 31, is respectively provided at the end portions of the cylindrical members remote from the sealing ring 23, and since these areas 30 and 31 are subjected to liquid pressure in opposition to the liquid pressure applied at the other end portions of the cylindrical members and in opposition to the inherent resilience of the sealing ring, the pressure distribution and intensity provided at the outer end portions of the cylindrical members is such as to afford reduction in friction at the sealing surfaces.

Thus when the service S has been pressurised, and when the slide 14 is in a position such that the aperture 17, the blind bore 18 and the aperture 13 are in co-axial alignment, less friction force is provided at the areas of sealing.

By virtue of the small annular areas of the portions 24, 25, high friction forces ordinarily characteristic of shear seals are reduced considerably during sliding of the slider.

Although in the above-described embodiment, the sealing rings are of circular cross-section, in alternative embodiments of the invention, the sealing rings are of rectangular cross-section.

Again, although in the embodiment described with reference to the drawings the sealing rings are of rubber material, in other embodiment, they are with advantage formed from a suitable plastics material, being reinforced as necessary.

Alternatively, in other embodiments, the sealing rings are instead of cruciform cross-section, thereby to afford yieldable characteristics.

As an alternative to the embodiments described with reference to FIGURE 1, instead of the sealing ring being loosely mounted between the cylindrical members, it is instead bonded to these members.

Although in the embodiments above described the invention is applied to liquid seals, in alternative embodiments, the invention is with advantage applied to pneumatic or other gaseous sealing.

I claim as my invention:

1. A fluid seal assembly suitable for positioning in a slider movable between two components, said slider and said components having flat mating surfaces, whereby fluid can pass under pressure through an aperture which is cut completely through the thickness of the slider and which is stepped up in size at both end portions thereof, said fluid being able to pass through or into an aperture in each of the components when said apertures are brought into alignment, which passage of fluid occurs substantially without leakage past said mating surfaces, said assembly comprising in combination: a pair of hollow members housed with a sliding fit in the aperture of said slider; a sealing member common to both hollow members and interposed between them to urge each hollow member outwardly, said sealing member having such inherent resilience as both to afford positive sealing engagement of said members with the flat mating surfaces of said components and to establish fluid sealing with the wall of the aperture of said slider, the portion of each hollow member which is in engagement with a flat mating surface being reduced in area with respect to the main portion of the member and both hollow members, at their end portions adjacent said components, having their external surfaces stepped-up in size in conformity with the stepped shape of the aperture of said slider to provide relative pressure distribution on the end faces of the members, whereby reduction in friction between the members and the mating surfaces of said components is provided.

2. A fluid seal assembly as claimed in claim 1, wherein the apertures are of circular cross-section and the hollow members are of stepped cylindrical form.

3. A fluid seal assembly as claimed in claim 1, wherein the sealing member is a sealing ring of substantially circular cross-section.

References Cited

UNITED STATES PATENTS

| | | | |
|---|---|---|---|
| 3,011,757 | 12/1961 | Miller | 251—172 |
| 3,026,084 | 3/1962 | Bryant | 251—282 |
| 3,188,049 | 6/1965 | Zawacki et al. | 251—282 XR |
| 3,215,163 | 11/1965 | Henderson | 251—175 XR |
| 2,601,990 | 12/1952 | Holzer | 137—625.64 |
| 2,989,985 | 6/1961 | Callan et al. | 137—625.25 |

SAMUEL ROTHBERG, *Primary Examiner.*

U.S. Cl. X.R.

277—62, 71